(12) United States Patent
Takayama

(10) Patent No.: US 10,440,307 B2
(45) Date of Patent: Oct. 8, 2019

(54) IMAGE PROCESSING DEVICE, IMAGE PROCESSING METHOD AND MEDIUM

(71) Applicant: CASIO COMPUTER CO., LTD., Tokyo (JP)

(72) Inventor: Yoshihiro Takayama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/282,537

(22) Filed: Sep. 30, 2016

(65) Prior Publication Data

US 2017/0177926 A1    Jun. 22, 2017

(30) Foreign Application Priority Data

Dec. 22, 2015  (JP) ................................. 2015-249410
Mar. 16, 2016  (JP) ................................. 2016-052641

(51) Int. Cl.
| | | |
|---|---|---|
| *H04N 5/445* | (2011.01) | |
| *G06K 9/00* | (2006.01) | |
| *G06T 5/00* | (2006.01) | |
| *H04N 5/232* | (2006.01) | |
| *G06K 9/20* | (2006.01) | |
| *H04N 5/217* | (2011.01) | |

(Continued)

(52) U.S. Cl.
CPC ..... *H04N 5/44591* (2013.01); *G06K 9/00255* (2013.01); *G06K 9/2081* (2013.01); *G06T 3/0062* (2013.01); *G06T 5/006* (2013.01); *H04N 5/217* (2013.01); *H04N 5/23216* (2013.01); *H04N 5/23219* (2013.01); *H04N 5/23293* (2013.01); *H04N 5/3572* (2013.01); *G06T 2207/30201* (2013.01)

(58) Field of Classification Search
CPC ............. H04N 5/2254; H04N 5/23212; H04N 5/3572; H04N 7/185
USPC ....... 382/118, 128, 170, 171, 190, 209, 260, 382/274, 275, 282; 358/3.26, 3.27, 537, 358/463
See application file for complete search history.

(56) References Cited

U.S. PATENT DOCUMENTS 5,185,667 A * 2/1993 Zimmermann ....... G06T 3/0018
                                                  348/143
5,657,073 A * 8/1997 Henley ................. G03B 37/04
                                                   348/38

(Continued)

FOREIGN PATENT DOCUMENTS

| CN | 104994281 A | 10/2015 |
|---|---|---|
| JP | 3066594 U | 12/1999 |
| JP | 2015-19162 A | 1/2015 |

OTHER PUBLICATIONS

SIPO; Application No. 201611033980; Office Action dated Apr. 29, 2019.

*Primary Examiner* — Yosef Kassa
(74) *Attorney, Agent, or Firm* — Fitch, Even, Tabin & Flannery LLP

(57) ABSTRACT

A control unit 21 of a main device 20 is configured to recognize a predetermined subject (face of person) included in a wide-angle image taken by an imaging device 10 and to correct distortion of an image (face image of the person) of a part of the subject, and to associate a part of the wide-angle image with the corrected image of the part of the subject, e.g., to display a part of the wide-angle image with the corrected image of the part of the subject on a reproduction screen.

24 Claims, 14 Drawing Sheets

(51) Int. Cl.
*H04N 5/357* (2011.01)
*G06T 3/00* (2006.01)

(56) References Cited

U.S. PATENT DOCUMENTS

| | | | | |
|---|---|---|---|---|
| 6,870,532 B2* | 3/2005 | Travers | ............ | G06T 15/04 345/419 |
| 6,922,292 B2* | 7/2005 | Bos | ............ | B60R 1/00 348/118 |
| 7,408,136 B2* | 8/2008 | Bechtel | ............ | B60Q 1/1423 250/205 |
| 7,612,946 B2* | 11/2009 | Kweon, II | ............ | G02B 13/06 359/648 |
| 7,750,936 B2* | 7/2010 | Provinsal | ............ | H04N 7/181 345/647 |
| 7,791,668 B2* | 9/2010 | Maeda | ............ | G03B 13/36 348/345 |
| 8,149,280 B2* | 4/2012 | Yoda | ............ | H04N 5/23219 348/207.1 |
| 8,204,955 B2* | 6/2012 | McBride | ............ | G06F 17/30017 709/203 |
| 8,320,634 B2* | 11/2012 | Deutsch | ............ | A61B 90/94 382/103 |
| 8,405,720 B2* | 3/2013 | Gupta | ............ | H04N 17/002 348/143 |
| 8,451,339 B2* | 5/2013 | Solomon | ............ | G02B 27/0025 348/208.11 |
| 8,456,527 B2* | 6/2013 | Elangovan | ............ | G06K 9/6202 348/142 |
| 8,515,130 B2* | 8/2013 | Aragane | ............ | H04N 7/15 348/14.08 |
| 8,526,678 B2* | 9/2013 | Liu | ............ | G06K 9/00771 382/103 |
| 8,589,410 B2* | 11/2013 | Sud | ............ | G06F 17/30864 707/748 |
| 8,625,907 B2* | 1/2014 | Zitnick | ............ | G06F 17/30256 382/225 |
| 8,754,829 B2* | 6/2014 | Lapstun | ............ | H04N 13/0402 345/419 |

* cited by examiner

SEPARATE-TYPE DIGITAL CAMERA

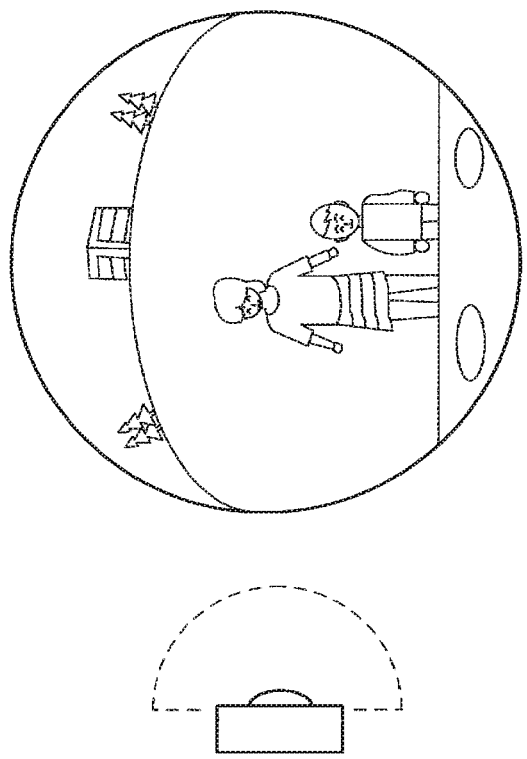
FIG. 4A    FIG. 4B
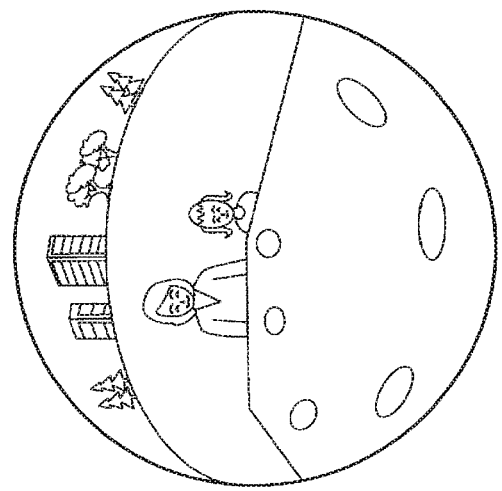
FORWARD 180° SHOOTING    REARWARD 180° SHOOTING

LIST OF THUMB-NAIL IMAGES

FISHEYE IMAGE

CORRECTED IMAGE

REPRODUCTION SCREEN

FIG. 6

23C IMAGE-MANAGEMENT TABLE

| FISHEYE IMAGE ID | SHOOTING TYPE | LINK ID | CORRECTED IMAGE ID | FACE IMAGE ID | FACE IMAGE ID | ... |
|---|---|---|---|---|---|---|
| A0001 | 180° | — | B0001 | C0001 | C0002 | ... |
| A0002 | 360° | A0003 | B0002 | C0004 | C0005 | ... |
| A0003 | 360° | A0002 | B0003 | C0006 | C0007 | ... |
| A0004 | 180° | — | B0004 | — | — | ... |
| ... | ... | ... | ... | ... | ... | ... |

FIG. 11A
LIST OF THUMB-NAILS OF FISHEYE IMAGES
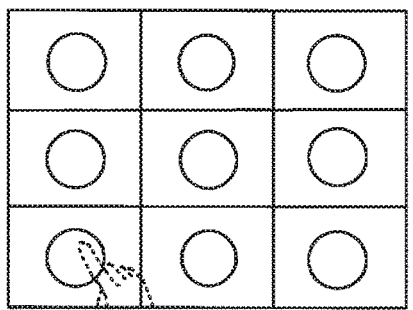
FIG. 11B
PARTLY ENLARGED VIEW
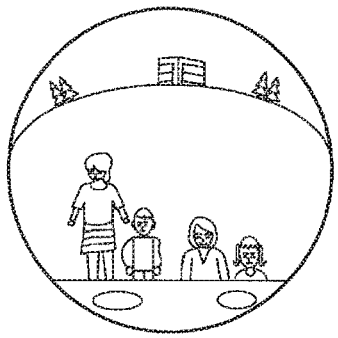
FIG. 11C
CUT OUT FACE IMAGES ONLY AND DISPLAY A LIST OF THEM
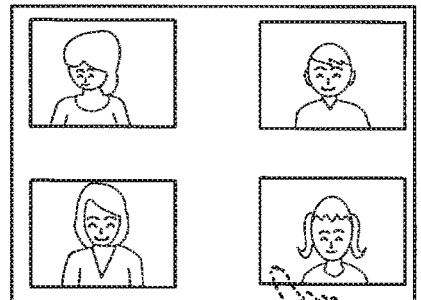
CORRECTED IMAGE OF FISHEYE IMAGE CORRESPONDING TO SELECTED SUBJECT
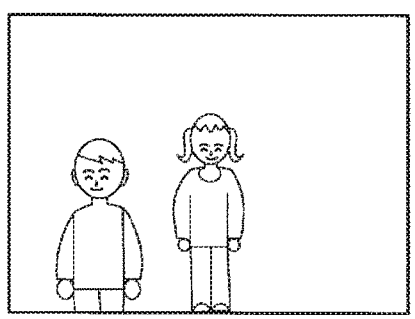
CORRECTED IMAGE OF FISHEYE IMAGE CORRESPONDING TO SELECTED SUBJECT
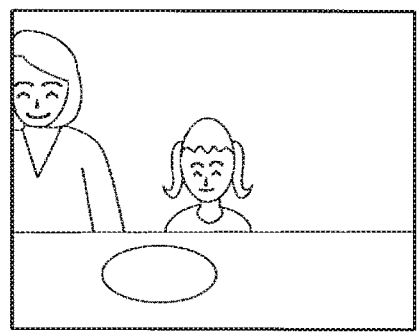
FIG. 11E
FIG. 11D

LIST OF THUMB-NAILS OF FISHEYE IMAGES

PARTLY ENLARGED VIEW

CORRECTED IMAGE OF FISHEYE IMAGE
CORRESPONDING TO SELECTED SUBJECT

IMAGE PROCESSING DEVICE, IMAGE PROCESSING METHOD AND MEDIUM

CROSS-REFERENCE TO RELATED APPLICATIONS

This application is based upon and claims the benefit of priority under 35 USC 119 of Japanese Patent Application No. 2015-249410 filed on Dec. 22, 2015 and No. 2016-052641 filed on Mar. 16, 2016 the entire disclosure of which, including the description, claims, drawings, and abstract, is incorporated herein by reference in its entirety.

BACKGROUND OF THE INVENTION

1. Field of the Invention

The present invention relates to an image processing device configured to process a wide-angle image taken at a wide angle, and relates to such an image processing method and a program.

2. Description of the Related Art

A fisheye lens is used for an imaging device, such as a digital still camera, and this lens can be used to take a wide-range of image having the angle of view that is substantially 180°, for example. An image (fisheye image) taken with a fisheye lens, however, includes a distortion that increases from the center part to the end (peripheral part) because it is based on the projection method. A technique of displaying such a fisheye image taken with a fisheye lens is disclosed, and Utility Model Registration No. 3066594, for example, discloses the technique of cutting an image in a predetermined range from a fisheye image and performing processing to correct the distortion of the image in the cut region, and then providing a user with an image free from distortion (corrected image). Laid open patent publication No. 2015-19162 discloses the technique of taking a circular image having distortion (fisheye image) containing faces of participants in the meeting using a fisheye lens, and then recognizing the faces of the participants and cutting the images of the participants, and displaying the image of each participant with their utterance time.

The present invention aims to provide a user with a fisheye image while clarifying the correspondence relationship of the fisheye image with a predetermined subject shown in the fisheye image.

BRIEF SUMMARY OF THE INVENTION

An image processing device of the present invention includes: an acquisition unit to acquire a wide-angle image; and a computing device which is configured to: recognize a predetermined subject included in the wide-angle image; correct distortion of the image of the part of the subject; and perform processing to associate at least a part of the wide-angle image with the image of the part of the subject with the distortion corrected.

A method for image processing of the present invention is performed by an image processing device, and includes the steps of: recognizing a predetermined subject included in a wide-angle image taken at a wide angle and detecting an image of a part of the subject; correcting distortion of the detected image of the part of the subject; and associating at least a part of the wide-angle image with the corrected image of the part of the subject.

A medium of the present invention has a program therein to make a computer of an image processing device implement the following functions of: recognizing a predetermined subject included in a wide-angle image taken at a wide angle and detecting an image of a part of the subject; correcting distortion of the detected image of the part of the subject; and associating at least a part of the wide-angle image with the corrected image of the part of the subject.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B show display examples of a fisheye image taken with a fisheye lens 16B.

FIG. 6 explains an image-management table 23c of the main device 20.

FIGS. 11A to 11E explain the reproduction of a fisheye image (stored image) in Embodiment 2.

DETAILED DESCRIPTION OF THE INVENTION

Embodiments of the present invention will be explained with reference to the drawings.

(Embodiment 1)

Referring to FIGS. 1A to 9, the following describes Embodiment 1 of the present invention.

Figure 1A:
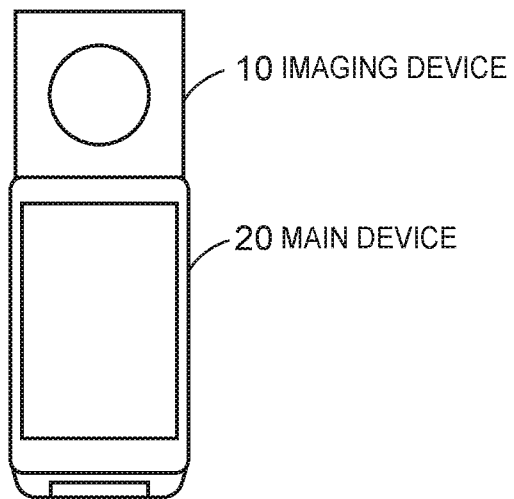
FIG. 1A shows the appearance of a digital camera as one example of the image processing device, showing the state where an imaging device 10 and a main device 20 of the device are combined as one unit.
Figure 1B:
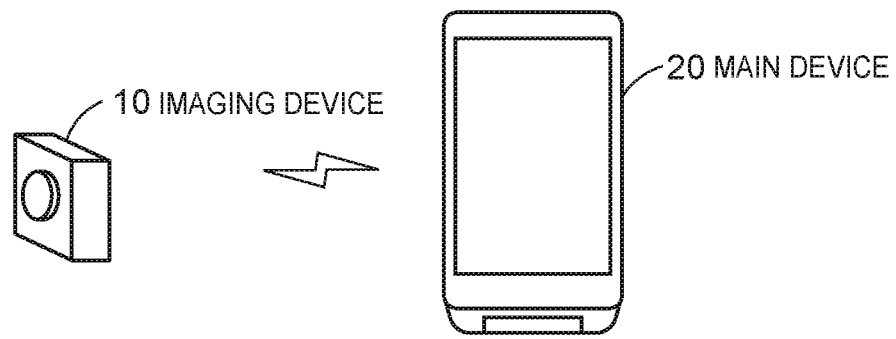
FIG. 1B shows the state where the imaging device 10 and the main device 20 are separated.

The present embodiment exemplifies the case where an image processing device is implemented as a digital camera. This digital camera is a separate-type digital camera that can be separated into an imaging device 10 having an imaging unit described later and a main device 20 having a display unit described later. FIG. 1A shows the state where the imaging device 10 and the main device 20 are combined as one unit, and FIG. 1B shows the state where the imaging device 10 and the main device 20 are separated. The imaging device 10 and the main device 20 making up this separate-type digital camera enable pairing (wireless-connection recognition) via wireless communication that both of the devices can use, and wireless LAN (Wi-Fi) or Bluetooth (registered trademark) is used for the wireless communication. The main device 20 is configured to receive and acquire an image taken by the imaging device 10 and display this taken image (live-view image). In the present embodiment, a taken image includes not only a stored image but also an image displayed on a live-view screen (live-view image: image before storage).

Figure 2A:
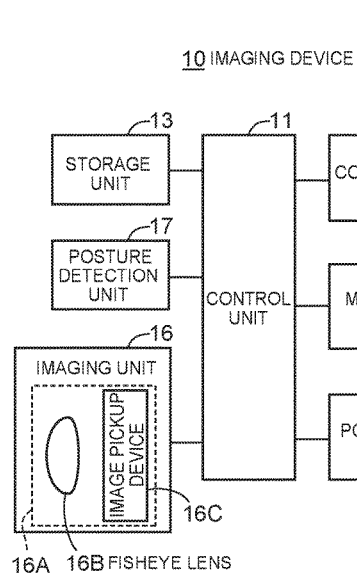
FIG. 2A is a block diagram showing the configuration of the imaging device 10.
Figure 2B:
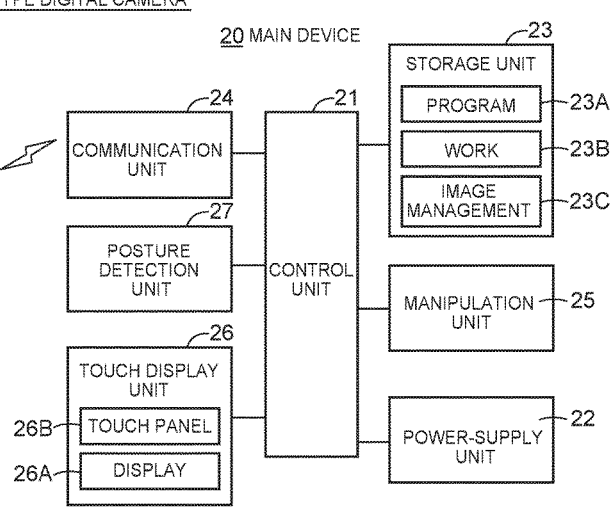
FIG. 2B is a block diagram showing the configuration of the main device 20.

FIG. 2A is a block diagram showing the configuration of the imaging device 10, and FIG. 2B is a block diagram showing the configuration of the main device 20.

In FIG. 2A, the imaging device 10 includes a control unit 11, a power-supply unit 12, a storage unit 13, a communication unit 14, a manipulation unit 15, an imaging unit 16, and a posture detection unit 17. The control unit 11 receives electric power supplied from the power-supply unit 12 (secondary battery) to operate so as to control the operation of this imaging device 10 as a whole in accordance with various programs in the storage unit 13. This control unit 11 is provided with a CPU (central processing unit) and a memory, not illustrated, for example. The storage unit 13 is configured to include a ROM, a flash memory or the like, and to store programs and various applications to implement the present embodiment. The communication unit 14 transmits a taken image to the main device 20 or receives a manipulation instruction signal or the like from the main device 20. The manipulation unit 15 includes a basic manipulation key (hardware key), such as a power-supply switch.

The imaging unit 16 makes up a camera unit that is capable of taking a high-definition image of a subject, and this imaging unit 16 includes a lens unit 16A provided with a fisheye lens 16B, an image pickup device 16C and the like. A camera of the present embodiment is of a replaceable type between a normal image pickup lens (not illustrated) and the fisheye lens 16B. The example in the drawing shows the state where the fisheye lens 16B is attached. This fisheye lens 16B includes a lens system having three lenses, which is configured as a circular fisheye lens capable of taking a wide range of image having the angle of view that is about 180°. A wide-angle image (fisheye image) taken with this fisheye lens 16B is a circular image as a whole. In this case, the wide-angle image (fisheye image) taken with the fisheye lens 16B has a distortion that increases from the center part toward the end because it is based on the projection method.

That is, the fisheye lens 16B is a circular fisheye lens capable of taking a wide range of image having the angle of view that is about 180°, and therefore the fisheye image as a whole is a circular image and includes a distortion that increases from the center part toward the end (peripheral part). Additionally, an image at the peripheral part has a size reduced as compared with the center part of the fisheye image, which leads to the difficulty for a user in visually confirming of the image at the peripheral part in details. When such an image (optical image) of the subject taken with the fisheye lens 16B is formed at the image pickup device 16C (e.g., a CMOS or a CCD), the image pickup device 16C performs photoelectric conversion of the image into an image signal (a signal with analogue value). Then an A/D conversion unit not illustrated converts the image signal into a digital signal, to which predetermined image display processing is performed. Then, the resultant is transmitted to the main device 20 for displaying on a monitor. The posture detection unit 17 is a three-axis gyroscope to detect the acceleration applied to the imaging device 10, and is configured to give the control unit 11 each acceleration component in X, Y or Z direction that is detected depending on the posture of the imaging device 10.

In FIG. 2B, the main device 20 has a reproduction function to reproduce an image taken with a fisheye lens or the like, and includes a control unit 21, a power-supply unit 22, a storage unit 23, a communication unit 24, a manipulation unit 25, a touch display unit 26, and a posture detection unit 27. The control unit 21 receives electric power supplied from the power-supply unit 22 (secondary battery) to operate so as to control the operation of this main device 20 as a whole in accordance with various programs in the storage unit 23. This control unit 21 is provided with a CPU (central processing unit) and a memory not illustrated, for example. The storage unit 23 is configured to include a ROM, a flash memory or the like, and includes a program memory 23A that stores programs and various applications to implement the present embodiment, a work memory 23B that temporarily stores various types of information (e.g., flags) required for the operation of the main device 20, an image-management table 23c described later, and the like.

The communication unit 24 transmits and receives various types of data with respect to the imaging device 10. The manipulation unit 25 includes various types of keys of a push-button type, such as a power-supply button, a release button, and setting buttons to set the shooting conditions about exposure, shutter speed and the like. The control unit 21 executes processing in accordance with an input manipulation single from this manipulation unit 25 or transmits an input manipulation signal to the imaging device 10. The touch display unit 26 is configured so that a touch panel 26B is stacked on a display 26A, such as a high-definition liquid crystal display. The display screen of the touch display unit 26 serves as a monitor screen (live-view screen) to display a taken image (fisheye image) in real time or as a reproduction display to reproduce a taken image. The posture detection unit 27 is a three-axis gyroscope to detect the acceleration applied to the main device 20, and is configured to give the control unit 21 each acceleration component in X, Y or Z direction that is detected depending on the posture of the main device 20.

When a release button is manipulated to instruct shooting, the control unit 21 of the main device 20 performs development processing of a fisheye image to create a taken image, performs image compression processing to the image and converts it to a standard file format, and then stores it in a recording medium of the storage unit 23. In this case, the control unit 21 performs processing to correct distortion of the fisheye image to create a corrected image, associates the corrected image with the fisheye image, and then records such a corrected image for storage. In this case, a plane that is in contact at any point on a virtual spherical model is used as a screen, and coordinates of a point on the virtual spherical model are changed into a point on the plane screen so as to correct the distortion of the fisheye image. Such processing to correct the distortion of a fisheye image is a commonly available and well-known technique in the field of image processing, and so the detailed descriptions thereon are omitted.

FIG. 3 describes the posture of the imaging device 10.

Figure 3A:
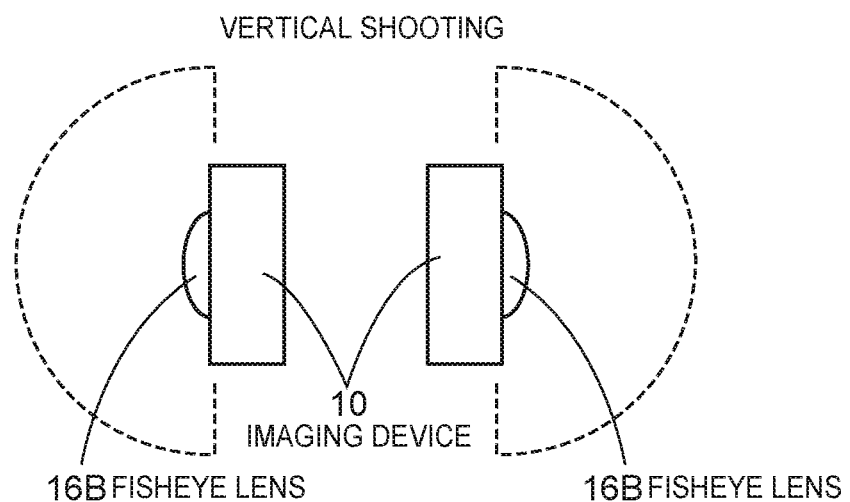
FIGS. 3A and 3B explain various postures of the imaging device 10 during shooting.
Figure 3B:
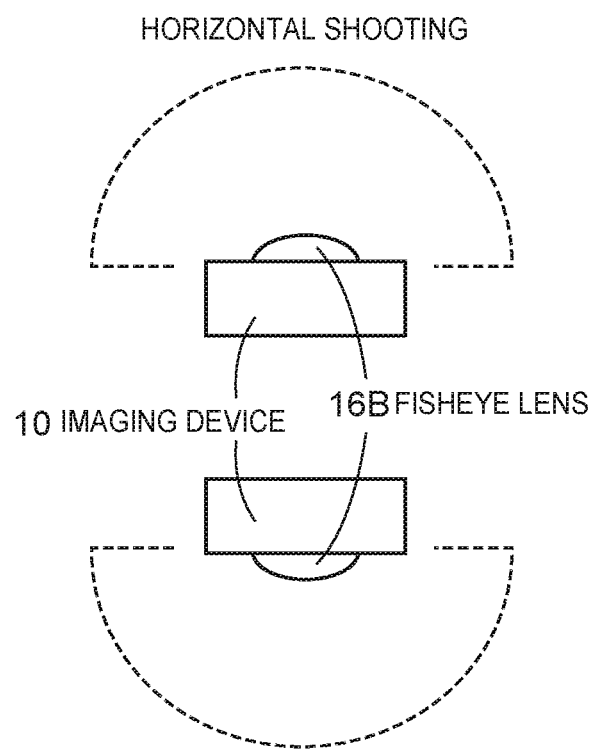

The imaging device 10 has a box shape as a whole, for example, and includes the fisheye lens 16b at a center part on the front face. FIG. 3A shows the case where the optical-axis direction of the fisheye lens 16b is substantially orthogonal to the direction of gravitational force, i.e., the case where shooting is performed so that the camera becomes substantially perpendicular to the ground (vertical shooting). In the drawing, the hemisphere indicated by broken lines shows the shooting range of the fisheye lens 16B when the angle of view is substantially 180°. FIG. 3B shows the case where the front-face direction of the camera (the optical axis direction of the fisheye lens 16B) is directed to the above, i.e., the case where shooting is performed so that the optical axis direction of the fisheye lens 16B is substantially in the opposite direction of the direction of gravitational force (horizontal shooting).

FIG. 4 exemplifies a wide-angle image (fisheye image) taken with the fisheye lens 16B, showing the state where the fisheye image is displayed on a reproduction screen of the touch display unit 26 of the main device 20.

The illustrated example shows a fisheye image that is taken by vertical shooting as in FIG. 3A. FIG. 4A shows a fisheye image in the case of vertical shooting of the forward 180° as the shooting range, and FIG. 4B shows a fisheye image in the case of vertical shooting of the rearward 180° as the shooting range. In this case, in order to perform 360° shooting, shooting is performed twice, including the forward 180° shooting and the rearward 180° shooting. The illustrated example is the shooting the state of a party held outside surrounding a table. FIG. 4A that is the forward 180° shooting shows a pair of a parent and a child, and FIG. 4B that is the rearward 180° shooting shows another pair of a parent and a child. The fisheye images that are shot across 360° in this way are collectively stored as a group of fisheye images.

The control unit 21 of the main device 20 receives and acquires a fisheye image taken by the imaging device 10. Then the control unit 21 corrects the distortion of the image as a whole, recognizes a predetermined subject included in the corrected image, and detects an image of a part of the subject for each subject. Thereafter the control unit 21 associates the image of a part of the corrected image with the detected image of a part of each subject. That is, the control unit 21 corrects the distortion of the fisheye images that are shot across 360° as stated above to create their corrected images, and associates the corrected images with their corresponding fisheye images for recording and storage. The control unit 21 further analyzes each corrected image, and detects all of predetermined subjects (faces of persons) included in the corrected image. Note here that this face-detection processing is a technique that is commonly used for a camera, including the detection of parts of a face, the detection of the color of skin or the like. Since the present embodiment uses such a well-known technique, the detailed descriptions thereon are omitted.

As a result of this face-detection processing, when the faces of all persons included in the corrected image are detected, then the control unit 21 cuts the part of the subject (face part) for each person along the outline of the person to create a face image, and associates each face image with the corresponding fisheye image for recording and storage. Note here that a face image is an image including the face mainly to enable the identification of the person, which may include an image of the upper half body (head, neck, shoulder). The image is not limited to a face, but a feature point may be detected from the image, and a feature region based on the feature point may be extracted. The control unit 21 is configured to perform image processing so that the face images have a predetermined shape and size before recording and storage.

FIG. 5 describes the reproduction of a fisheye image (stored image).

Figure 5A:
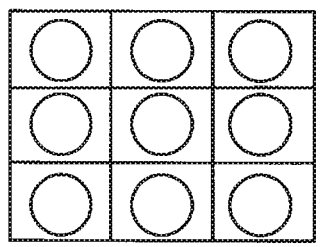
FIGS. 5A to 5D explain the reproduction of a fisheye image (stored image).
Figure 5B:

FIG. 5A shows the screen of a list, on which various types of fisheye images (stored images) are thumb-nail displayed on the touch display unit 26 of the main device 20. Each of the circles in the drawing shows a fisheye image, and the drawing shows the state where the fisheye images are thumb-nail displayed in the form of 3×3 matrix. When the position of any one of the thumb-nail images is touched, the control unit 21 selects the touched thumb-nail image (fisheye image) as a reproduction target. FIG. 5B shows the fisheye image selected as the reproduction target, and shows the case where, between the fisheye images across 360° as stated above, the fisheye image of the forward 180° shooting (see FIG. 4A) is selected.

Figure 5C:
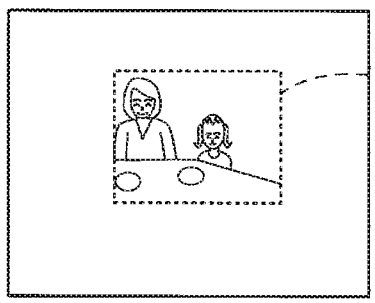

FIG. 5C shows an image in a predetermined range that is cut from the corrected image, and the corrected image is recorded and stored while being associated with the fisheye image selected as the reproduction target. In this case, an image in a predetermined range (e.g., a rectangular cut-out frame) is cut from the corrected image. This cut-out frame (virtual frame) is similar to the corrected image. For instance, the frame is a rectangular frame having a size of ¼ of the corrected image, which is set at an initial position (at a center part) on the corrected image when the fisheye image is firstly selected. The cut-out frame is movable to any position on the corrected image by user's operation. In the illustrated example, an image in the rectangular cut-out frame indicated with the broken lines (an image including a parent and a child) is cut out.

Figure 5D:
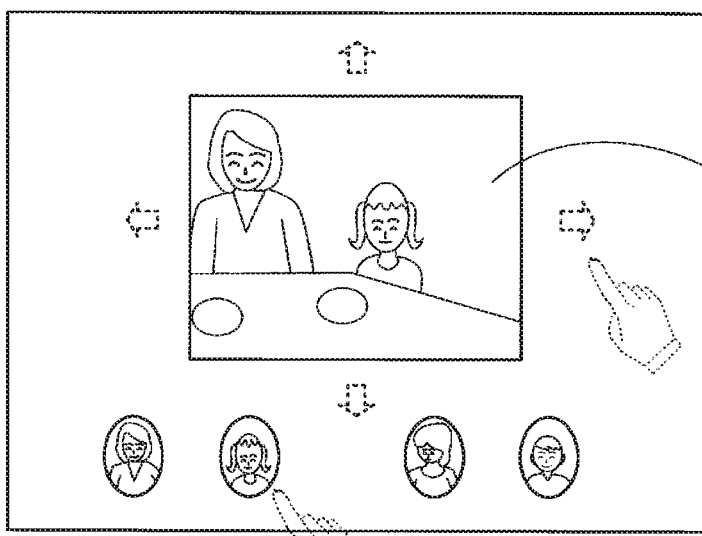

FIG. 5D shows a reproduction screen of the fisheye image selected as the reproduction target. This reproduction screen displays an enlarged image of a part of the corrected image as stated above (the image in the cut-out frame) as well as a list of face images of persons that are associated with the fisheye image. In this case, not only the face images of the persons included in the fisheye image selected by the touch operation (e.g., the fisheye image of FIG. 4A) but also the face images of the persons included in another fisheye image that is included in the same group as the former fisheye image (e.g., the fisheye image of FIG. 4B) are displayed as the list. At this time, the face images of these persons are displayed as the list, which are arranged in the order of their arranged order in the fisheye images. Herein, the face images of the persons are aligned on the screen along a line at a lower part of the reproduction screen as shown in the drawing. In this case, the face images of a parent and a child on the left are of the persons included in the fisheye image of FIG. 4A, and the face images of a parent and a child on the right are of the persons included in the fisheye image of FIG. 4B.

In the drawing, the broken-line arrow shown around the enlarged image (image in the cut-out frame) indicates moving directions of the cut-out frame that is movable in response to a touch operation. This cut-out frame moves in response to a touch operation (slide operation) on the touch display unit 26 in accordance with the sliding direction and the slide amount. Then, the image in the cut-out frame (enlarged image) displayed on the reproduction screen also can be changed in the contents in accordance with the movement of the cut-out frame. The moving direction of the cut-out frame is not limited to the four directions of up, down, left and right, and may be moved diagonally. On the reproduction screen, a continuous twice tap operation (double-tap operation) also is an effective touch operation in addition to the slide operation as stated above. When a double-tap operation is performed on any face image, the control unit 21 detects the position of the face image in the corrected image, and moves (jumps) the cut-out frame to the detected position, so that the enlarged image on the reproduction image (image in the cut-out frame) can include the face image.

FIG. 6 describes the image-management table 23c of the main device 20.

The image-management table 23c is to manage fisheye images (stored images) and images associated therewith. The image-management table 23c has fields of "fisheye image ID", "shooting type", "link ID", "corrected image ID", "face image ID", "face image ID" and the like. The "fisheye image ID" is to store information (e.g., a serial number) to identify a fisheye image file (not illustrated) so as to manage the fisheye image, and in the illustrated example, "A0001", "A0002" and the like are stored. The "shooting type" is to store the types of shooting, indicating the fisheye image is shot at 180° or at 360°, and the illustrated example shows that the images with the "fisheye image IDs" of "A0002" and "A0003" are in a group of fisheye images of 360° shooting.

The "link ID" is to store the "fisheye image ID" of another fisheye image that makes up the group when the "shooting type" is 360° shooting. In the illustrated example, "A0003" is stored in the "link ID" for the fisheye image with the "fisheye image ID" of "A0002", indicating another fisheye image, and "A0002" is stored in the "link ID" for the fisheye image with the "fisheye image ID" of "A0003", indicating another fisheye image. The "corrected image ID" is to store information (e.g., a serial number) to identify a corrected image file (not illustrated) so as to manage the corrected image, in which the distortion has been corrected, in association with the fisheye image, and in the illustrated example, "B0001", "B0002" and the like are stored. The "face image ID" is to store information (e.g., a serial number) to identify a face-image file (not illustrated) so as to manage the face image of each person included in the fisheye image in association with the fisheye image, and in the illustrated example, "C0001", "C0002" and the like are stored.

Referring next to the flowcharts of FIGS. 7 to 9, the operating concept of the image processing device (digital camera) in Embodiment 1 is described below. The functions described in these flowcharts are stored in the format of readable program codes, and the operations are executed sequentially in accordance with these program codes. The operations may be executed sequentially in accordance with such program codes that are transmitted via a transmission medium, such as a network.

In other words, the operation specific to the present embodiment can be executed using programs/data that are externally supplied via a transmission medium, instead of a recording medium. FIGS. 7 to 9 are flowcharts showing the outline of the operation that is a feature part of Embodiment 1 in the overall operation of the digital camera. When the procedure leaves the flow in FIGS. 7 to 9, it returns to the main flow (not illustrated) of the overall operation.

Figure 7:
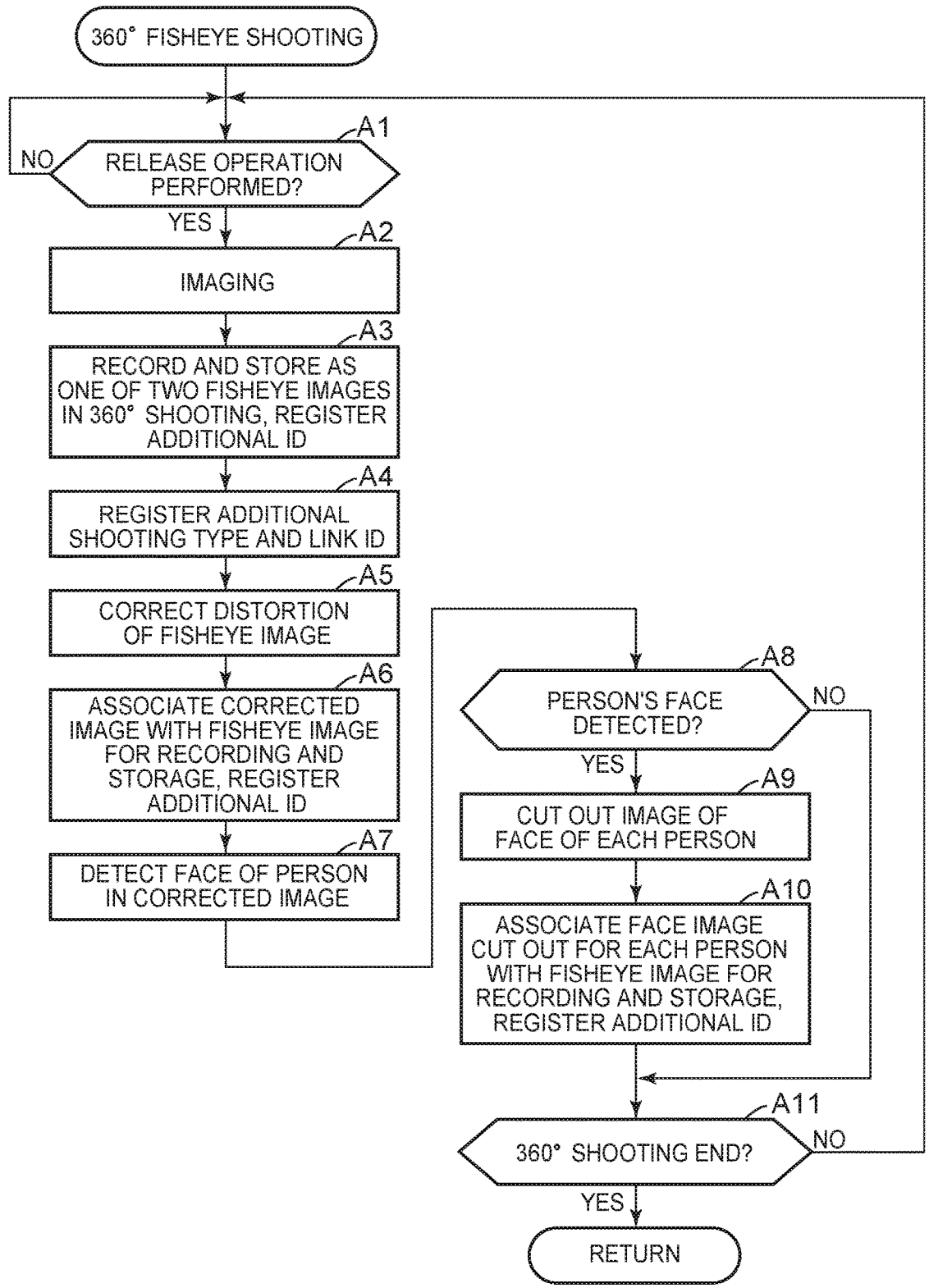
FIG. 7 is a flowchart to explain the operation of the main device 20 during 360° shooting (operation of a feature part of Embodiment 1).

FIG. 7 is a flowchart to describe the operation (the operation of a feature part of the present embodiment) of the main device 20 in the case of 360° shooting. Herein 360° shooting is a menu item that is selected by user's operation from the menu screen to let the user select various types of shooting modes. When the menu item of this 360° shooting is selected, the operation of FIG. 7 starts.

Firstly in response to a release operation (YES at Step A1) during the stand-by state for release operation (Step A1), the control unit 21 of the main device 20 performs developing processing to a fisheye image received and acquired from the imaging device 10 to create a taken image, performs image compression processing to the image and converts it to a standard file format (Step A2), and then stores it in a recording medium of the storage unit 23 for storing (Step A3). In this case, two fisheye images obtained by the 360° shooting are recorded and stored as a group of images. Further "A0002" is created, for example, as a new "fisheye image ID", and is additionally registered with the image-management table 23c.

Then the control unit 21 registers "360° shooting" as the "shooting type" corresponding to this new "fisheye image ID" with the image-management table 23c, and registers the corresponding "link ID" (Step A4). Herein, this registration of "link ID" is performed at the second shooting in the 360° shooting. Next the control unit 21 corrects the distortion of the fisheye image to create a corrected image thereof (Step A5), and records and stores the corrected image in the recording medium of the storage unit 23. At this time, the control unit 21 creates "B0002", for example, as a new "corrected image ID", and associates it with "A0002" of the "fisheye image ID" for registration with the image-management table 23c (Step A6).

The control unit 21 then analyzes this corrected image as a whole to detect a face of a person there (Step A7). The control unit 21 checks the result whether a face of a person can be detected or not (Step A8), and if no face of a person is detected (NO at Step A8), the procedure shifts to Step A11, where the control unit 21 checks whether the 360° shooting ends or not. Since this is the case where the first shooting in the 360° shooting ends (NO at Step A11), the procedure returns to Step A1 as stated above, and becomes a stand-by state for a release operation to instruct the second shooting in the 360° shooting.

If a face of a person is detected in the corrected image (YES at Step A8), then the control unit 21 cuts out the person along the outline of the person to create a face image thereof (Step A9). In this case, face images are created for all of the persons included in the corrected image. Also in the case where the distortion in a face image is too large to detect the face of the person precisely after the distortion correction as in the image of a person located at the periphery of the fisheye image, if the image may be of a person, the face image thereof can be created. In this way, the face images are created by cutting out the images of the individual persons, and these face images are processed to have a predetermined shape and size. Then, they are associated with the corresponding fisheye image and are recorded and stored in the recording medium of the storage unit 23. In this case, "C0004" and "C0005" are created as the "face image IDs", and they are associated with "A0002" of the "fisheye image ID", and are registered with the image-management table 23c (Step A10). Then such an operation (Steps A1 to A11) is repeated until the 360° shooting ends, and when the 360° shooting ends (YES at Step A11), the procedure leaves the flow of FIG. 7.

Figure 8:
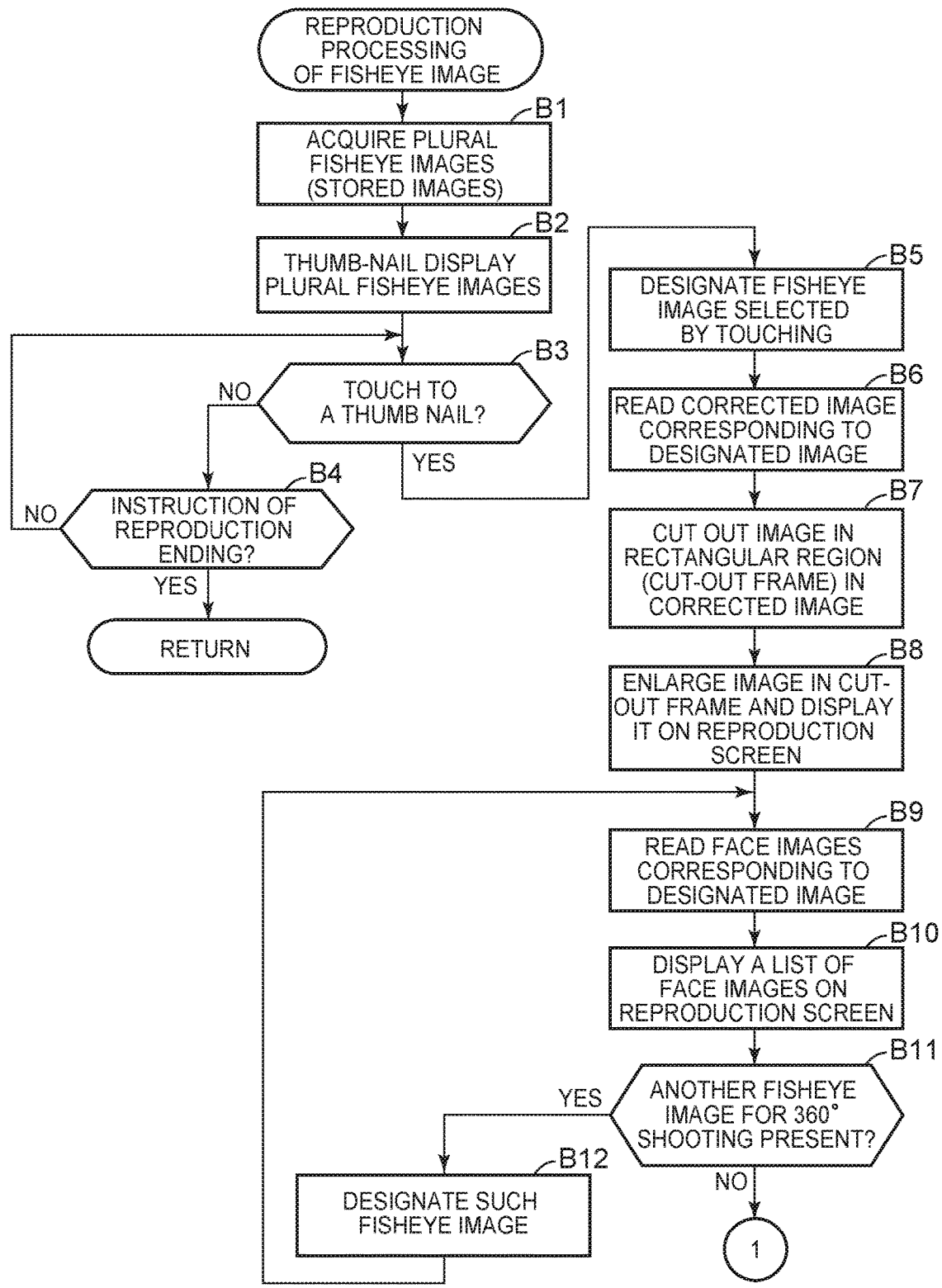
FIG. 8 is a flowchart showing the operation of the main device 20 to reproduce a fisheye image (stored image) (operation of a feature part of Embodiment 1).
Figure 9:
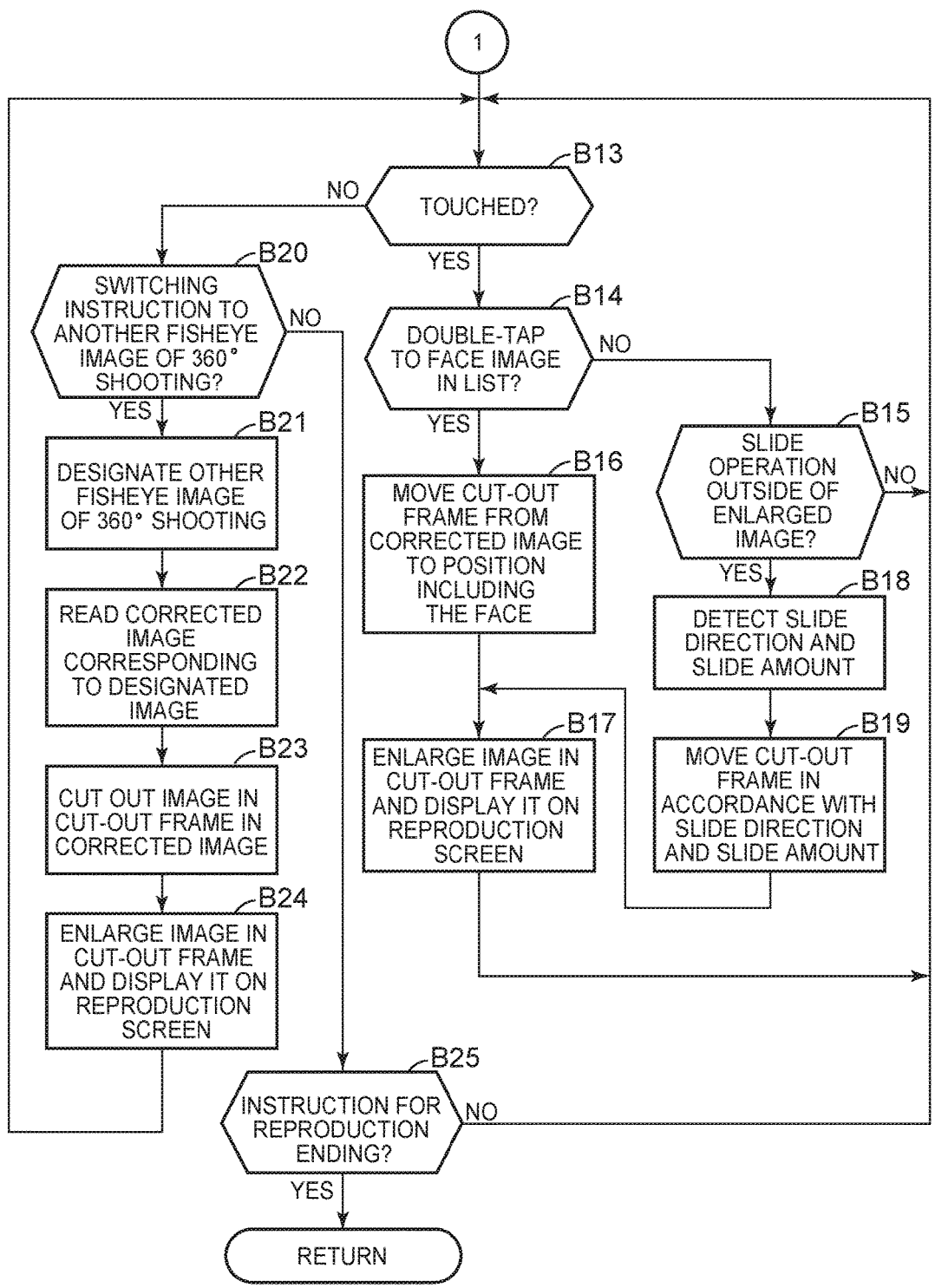
FIG. 9 is a flowchart showing the operation following FIG. 8.

FIGS. 8 and 9 are flowcharts showing the operation (operation of a feature part of the present embodiment) of the main device 20 when a fisheye image (stored image) is reproduced.

Firstly in response to an instruction of reproduction of a fisheye image (stored image) by user's operation, the control unit 21 reads a plurality of fisheye images (stored images) recorded and stored in the recording medium of the storage unit 23 (Step B1), converts them into thumb-nail images for displaying as a list (Step B2). In this state, the control unit 21 checks whether a user performs a touch operation to designate any thumb-nail image in the list as a reproduction target (Step B3). If no touch operation is performed (NO at Step B3), the control unit 21 checks whether a key to instruct reproduction ending that is a predetermined key of the manipulation unit 25 is operated or not (Step B4). Herein if reproduction ending is not instructed (NO at Step B4), the procedure returns to Step B3 as stated above. If reproduction ending is instructed (YES at Step B4), the procedure leaves the flow of FIGS. 8 and 9.

When a position of any thumb-nail image is touched on the list including a plurality of fisheye images that are displayed as thumb-nail images in a matrix form (YES at Step B3), the control unit 21 selects and designates the fisheye image as a reproduction target (Step B5). Then, the control unit 21 reads the stored corrected image associated with this designated image (fisheye image) (Step B6), and cuts out an image in a rectangular region (cut-out frame) from the corrected image (Step B7). In this case, at the initial stage of the fisheye image being selected, the cut-out frame is set at the initial position (at a center part) on the corrected image, and therefore an image at the center part of the corrected image is cut out. Then, the cut-out image is enlarged to a predetermined size, and is displayed at a center part of the reproduction screen (Step B8).

Next, the control unit 21 reads stored face images that are associated with the designated image (fisheye image) as stated above (Step B9), and displays these face images on the reproduction screen as the list (Step B10). In this case, as shown in FIG. 5D, the face images are displayed on the reproduction screen along a horizontal line at a lower part of the reproduction screen. Their order in the line follows the order of the persons in the fisheye image as stated above. Then the control unit 21 checks another fisheye image forming a group with the designated image (fisheye image) as stated above whether the other fisheye image across 360° is designated or not (Step B11). If there is any fisheye image not designated (YES at Step B11), the control unit 21 designates such a not-designated fisheye mage as a reproduction target (Step B12), and then the procedure returns to Step B9 as stated above. At Step B9, the control unit 21 reads stored face image that are associated with this new designated image (fisheye image), and displays these face images on the reproduction screen as the list (Step B10). Thereby, when all of the fisheye images for the 360° shooting are designated (NO at Step B11), the procedure shifts to the flow in FIG. 9.

In the state where such a reproduction screen is displayed on the touch display unit 26, when a touch operation is performed on the reproduction screen (YES at Step B13), the control unit 21 checks whether such a touch operation is a double-tap operation to a face image on the list (Step B14) or a slid operation near the enlarged corrected image (the image in the cut-out frame) (Step B15). When it is a double-tap operation to a face image (YES at Step B14), the control unit 21 specifies the position including the face on the corrected image, and moves the cut-out frame to the detected position (Step B16). For instance, when a double-tap operation is performed on a face image of the girl as shown in FIG. 5D, the control unit 21 specifies a face image of the girl in the corrected image, and moves the cut-out frame so that the face image is located at a center position of the cut-out frame. Then, the control unit 21 cuts out the image in the cut-out frame and displays the enlarged image thereof on the reproduction screen (Step B17). Then, the procedure returns to Step B13.

When the touch operation on the reproduction screen is a slide operation near the enlarged corrected image (the image in the cut-out frame) (YES at Step B15), the control unit 21 detects the sliding direction and the amount of sliding (Step B18), and moves the cut-out frame on the corrected image in accordance with these sliding direction and amount of sliding (Step B19). Then, the control unit 21 cuts out the image in the cut-out frame on the corrected image, and displays the enlarged image thereof on the reproduction screen (Step B17). Then, the procedure returns to Step B13.

On the contrary, when a key as a predetermined key of the manipulation unit 25 to instruct the switching to another fisheye image of the 360° shooting is operated, for example, instead of a touch operation on the reproduction screen (NO at Step B13) (YES at Step B20), the control unit 21 designates the other fisheye image from the two fisheye images for the 360° shooting as a reproduction target (Step B21), and then reads the stored corrected image that is associated with the designated image (Step B22). Then, the control unit 21 cuts out the image in the cut-out frame in the corrected image (Step B23), and displays the enlarged cut-out image on the reproduction screen (Step B24). Then, the procedure returns to Step B13. When a key as a predetermined key of the manipulation unit 25 to instruct reproduction ending is operated (YES at Step B25), the procedure leaves the flow of FIGS. 7 and 8.

As stated above, in Embodiment 1, the control unit 21 of the main device 20 is configured to recognize a predetermined subject included in a wide-angle image (fisheye image) taken by the imaging device 10, correct distortion of the image of the subject part, and associate a part of the wide-angle image with the corrected image of the subject part. With this configuration, a correspondence relationship between the fisheye image and the predetermined subject shown in the fisheye image can be clarified and then these images can be provided to a user.

The control unit 21 is configured to correct the distortion of a wide-angle image (fisheye image) taken by the imaging device 10 and to recognize a predetermined subject (face of a person) included in the corrected image and detect the image (face image) of the subject part for each subject (person), and associate a part of the corrected image with the image (face image) of each subject part detected. With this configuration, a wide-angle image including the predetermined subject taken at a wide angle can be converted into a format such that the predetermined subject can be easily viewed. For instance, the image with the distortion corrected is displayed in association with a face image of each person instead of displaying of the wide-angle image having large distortion as it is during the display of the image, whereby the wide-angle image can be displayed in an easy-viewable state, so that a user can confirm the person easily.

The control unit 21 is configured to display an enlarged image in a predetermined range (cut-out frame) of the corrected image, and display images (face images) of subject parts detected as the list. With this configuration, a part of the corrected image can be displayed instead of displaying of the wide-angle image having large distortion as a whole during the display of the image, so that the wide-angle image can be displayed in an easy-viewable state. That is, a user can confirm a subject with a part of the corrected image that is taken at a wide angle, and can confirm all of the persons included in the image taken at a wide angle, including a person whose image is not displayed at the part of the corrected image.

The control unit 21 is configured to display a list of the images (face images) of the subject parts detected in the order following the order of the subjects (persons) in the wide-angle image. With this configuration, a user can easily confirm as to where the persons are on the image simply by checking the list of the face images.

The control unit 21 is configured to move a predetermined range (cut-out frame) freely based on user's operation (slide operation), and to enlarge the cut-out image and display it in response to the movement of the cut-out frame. With this configuration, a user can confirm a desired part of the corrected image easily in the details.

The control unit 21 is configured to recognize all of predetermined subjects (faces of persons) included in a wide-angle image group including a plurality of wide-angle images as the group taken in different shooting directions, and detect the image of the subject part (face image) for each subject. With this configuration, when 360° shooting is performed twice, including forward 180° shooting and rearward 180° shooting as well, a user can detect the faces of all of the persons around there.

The control unit 21 is configured to, when a wide-angle image is designated as a display target from a wide-image group including a plurality of wide-angle images as the group taken in different shooting directions, associate a corrected image of the designated wide-angle image with images (faces of the persons) of all of the subject parts detected from the wide-angle image group for displaying. With this configuration, a user can view the plurality of images by switching among the plurality of images (corrected images) for displaying.

The control unit 21 is configured to designate, as a display target, any wide-angle image selected by user's operation from a wide-image group taken in different shooting directions. With this configuration, a user can switch the screen into a desired image from a plurality of images (corrected images) taken in different shooting directions for designation, and can view an enlarged display of the image.

The control unit 21 is configured to, when any wide-angle image is selected by user's operation from a list of thumbnail images of wide-angle images (fisheye images), enlarge the corrected image of the selected wide-angle image for displaying, and display a list of the images of the subject parts detected (face images). With this configuration, a user can select any desired fisheye image from a lot of fisheye images and can confirm the image in an easy viewable state.

The control unit 21 is configured to associate a corrected image with an image of each subject part (face image) for recording and storage. This can eliminate the processing of distortion correction of a wide-angle image or cutting-out of a face image from the corrected image every time the image is reproduced.

(Modification Example 1)

In Embodiment 1 as stated above, any fisheye image is selected by user's operation from a group of fisheye image group taken in different shooting directions, and such an image is designated as a display target. Instead, the fisheye images may be sequentially selected one by one in the predetermined order at predetermined timing, and the corrected images thereof may be displayed while being switched. This allows a user to view these fisheye images (corrected images) in the predetermined order. In this case, face images of persons included in a fisheye image (corrected image) being displayed of 360° shooting and face images of persons included in a fisheye image (corrected image) not being displayed may be distinguished and displayed as a list. This allows a user to easily confirm the correspondence relationship between the fisheye images (corrected images) and the face images of the persons.

(Modification Example 2)

In Embodiment 1 as stated above, a list of the face images of all of the persons included in a group of fisheye images taken in different directions is displayed. Instead, a specific face image may be recognized for displaying. For instance, a person included at a part of the corrected that is enlarged and being displayed may be specified, and the face image of this person only may be recognized and displayed (e.g., displayed in different colors, enlarged displaying). Thereby the person included at a part of the corrected image that is enlarged and being displayed and another person that is included at a part not being displayed in the corrected image can be distinguished and displayed. Herein, when the other person included in the part not being displayed is to be confirmed by enlarged displaying, the cut-out frame may be moved to the position where the person can be in the frame.

(Modification Example 3)

In Embodiment 1 as stated above, a circular fisheye lens is shown as an example of the fisheye lens 16B, and a diagonal fisheye lens may be used. In the embodiment as stated above, 360° shooting is performed by shooting performed twice using one fisheye lens 16B, including the forward 180° shooting and the rearward 180° shooting. Instead, two of the fisheye lens 16B may be provided, e.g., each being disposed on either of the surface and the rear-face of the camera body, whereby the forward 180° shooting and the rearward 180° shooting may be performed at the same time in response to an instruction of the 360° shooting. Alternatively, 360° shooting may be performed by shooting performed a plurality of times using an ultrawide lens.

(Modified Example 4)

In Embodiment 1 as stated above, the control unit 21 of the main device 20 is configured to receive and acquire a fisheye image taken by the imaging device 10 and correct the distortion of the image as a whole. The control unit 21 then is configured to recognize a predetermined subject included in the corrected image and an image of the subject part for each subject, and associate the image at a part of the corrected image with the image of each subject part detected. This is not a limiting example, and the control unit 21 of the main device 20 may be configured to, when receiving and acquiring a fisheye image taken by the imaging device 10, recognize a predetermined subject included in the fisheye image without correcting the distortion of the fisheye image and detect an image of the subject part for each subject. Then, the control unit 21 may be configured to associate the image of a part of the fisheye image with the image of each subject part detected.

In this case, the image of each subject part detected still has distortion, and therefore the distortion may be corrected for the image of each subject part at a predetermined timing, e.g., at the same timing as the processing of associating as stated above or a timing before and after that, or at the same timing as cutting-out of the subject part for each person or a timing before and after that. Such processing of associating a part of the fisheye image still having distortion with the image of the subject part corrected may be performed by, for example, displaying a part of the fisheye image on the reproduction screen as well as a list of the images of the subject parts corrected on the reproduction screen. Thereby similarly to the embodiment as stated above, a correspondence relationship between the fisheye image and a predetermined subject shown in the fisheye image can be clarified, and then these images can be provided to a user.

(Modification Example 5)

In Embodiment 1 as stated above, a corrected image is recorded and stored so as to be associated with a fisheye image, and when a fisheye image is selected as a reproduction target, an image in a predetermined range is cut out from the corrected image associated with the fisheye image. This is not a limiting example, and the fisheye image selected as a reproduction target may be displayed directly. That is, a fisheye image still having distortion and a list of images (face images) of the subject parts detected may be displayed. In this case as well, similarly to the embodiment as stated above, a correspondence relationship between the fisheye image and a predetermined subject shown in the fisheye image can be clarified, and then these images can be provided to a user.

(Modification Example 6)

In Embodiment 1 as stated above, a wide-angle image as a display target is designated by user's operation from a group of wide-angle images including a plurality of wide-angle images as the group taken in different shooting directions. Then, the corrected image of the designated wide-angle image and images (faces of the persons) of all of the subject parts detected from the wide-angle image group are associated and displayed. Instead, when a wide-angle image as a display target is designated by user's operation from a group of wide-angle images, the designated wide-angle image (still having distortion) and images (faces of the persons) of all of the subject parts detected from the wide-angle image group may be associated and displayed. Thereby, a user can view the plurality of wide-angle images by switching the plurality of wide-angle images for displaying.

In Embodiment 1 as stated above, the image in a predetermined range (cut-out frame) of a corrected image is enlarged and displayed, and a list of the images (face images) of the subject parts detected is displayed. Instead, the corrected image as a whole that is recorded and stored to be associated with the fisheye image selected as the reproduction target and a list of the images (face images) of the subject parts detected may be displayed.

In Embodiment 1 as stated above, a fisheye image, a corrected image and face images of persons are associated for recording and storage. Instead, a fisheye image, a corrected image and face images of persons may be output to the outside with a removable portable memory (recording medium), such as a SD card or a USB memory, or via communication means, and the corrected image and the face images of the persons may be associated and displayed by an external device.

In Embodiment 1 as stated above, a part (image in the cut-out frame) of the corrected image obtained by correcting distortion of a fisheye image is enlarged and displayed on the reproduction screen. Instead, the corrected image as a whole may be displayed on the reproduction screen.

In Embodiment 1 as stated above, 360° shooting is performed by shooting performed twice, including the forward 180° shooting and the rearward 180° shooting, and the plurality of fisheye images obtained forms a group. The range of shooting by the fisheye lens 16B is not limited to 180° shooting, and any range may be used. Further, the shooting is not limited to 360° shooting, and the embodiment can be used for the image taken in the range of 180° as well.

In the embodiment as stated above, the control unit 21 is configured to, when a double-tap operation is performed on any face image, detect the position including the face image in the corrected image, and move (jump) the cut-out frame to the detected position so that the face image is included in the image (image in the cut-out frame) that is enlarged and displayed on the reproduction screen. Instead, a slide operation may be performed on any face image, and the image displayed as the any face image may be changed in accordance with the amount of the sliding. That is, the position including the any face image in the corrected image may be moved in accordance with the amount of sliding, and an image at the position after movement in the corrected image may be displayed instead of the any face image. In that case, when a double-tap operation is performed on the image after movement that is displayed instead of the any face image, the control unit 21 detects the position including the image after movement in the corrected image and moves the cut-out frame to the detected position, so as to let the enlarged image on the reproduction screen include the image after movement.

(Embodiment 2)

Referring now to FIGS. 10 and 11A-11E Embodiment 2 of the present invention is described.

Embodiment 1 as stated above is configured so that, when a user touches a display position of any thumb-nail image in a list of a plurality of thumb-nail fisheye images so as to reproduce the fisheye image (stored image), the screen is switched to a part of the corrected image (image in the cut-out frame) that is associated with the fisheye image. In Embodiment 2, when a user touches a fisheye image (thumb-nail image), the screen is switched to a list of face images of persons that are associated with the fisheye image.

Further, Embodiment 1 is configured to, when a user touches a face image displayed together with the corrected image, detect the position of the face image in the corrected image and move the cut-out frame to the detected position so that the face image is included in the image in the cut-out frame. In Embodiment 2, when a user touches any face image in a list of face images on the screen, the screen is switched to the corrected image that is associated with the fisheye image including the face image (the fisheye image selected from a thumb-nail list screen). Herein, the components with the same functions and the same names in both of the embodiments have the same reference numerals, and their descriptions are omitted. In the following, feature parts of Embodiment 2 are described mainly.

The operation for shooting in Embodiment 2 is the same as Embodiment 1 as stated above. That is, development processing is performed to a taken fisheye image, and is recorded and stored in a recording medium of the storage unit 23. At this time, processing to correct the distortion is performed to this fisheye image to create a corrected image thereof, and this corrected image is associated with the fisheye image for recording and storage. Then, faces of persons included in this corrected image are detected, and a face part is cut out for each person to create a face image (corrected image), and the face images are associated with the fisheye image for recording and storage.

Figure 10:
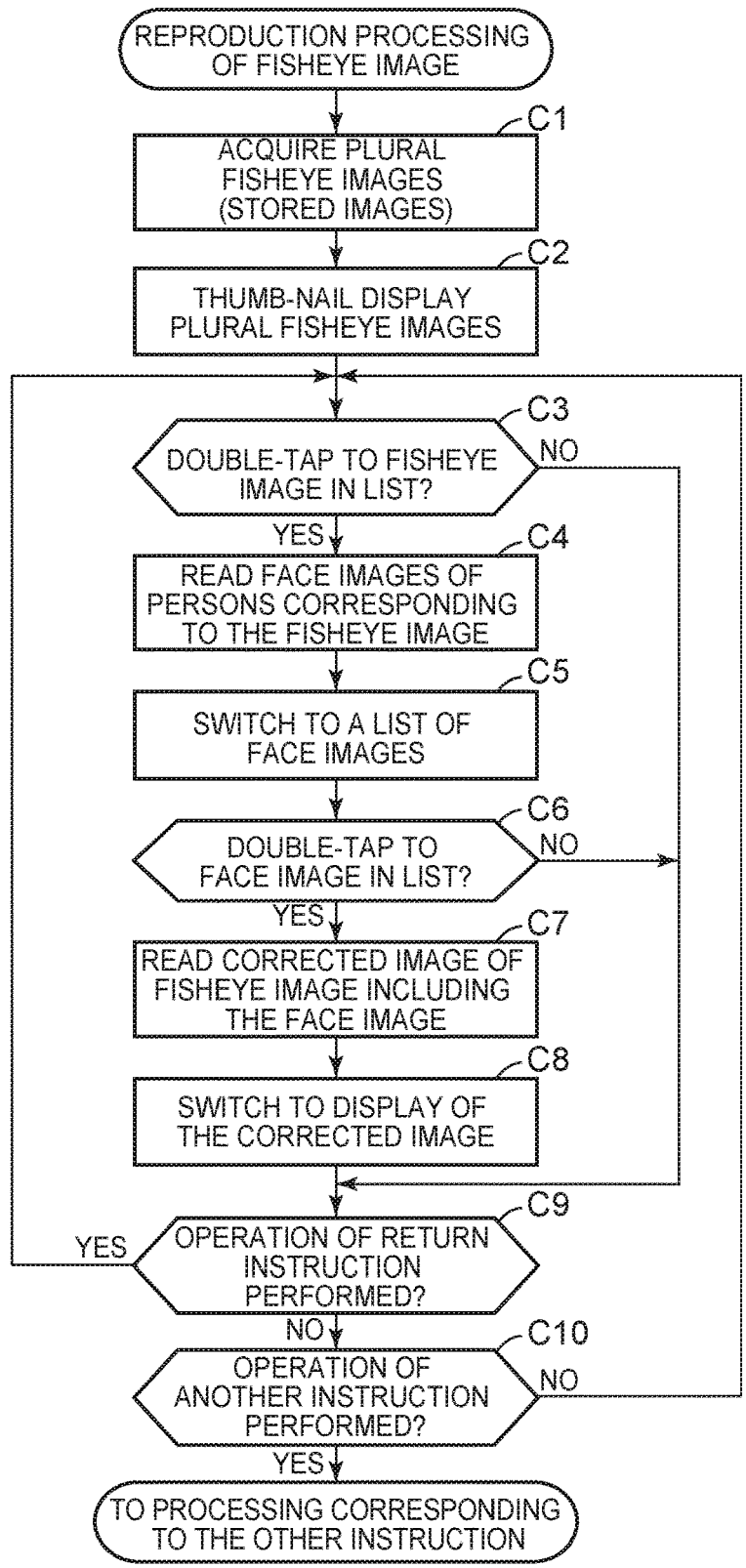
FIG. 10 is a flowchart showing the operation of the main device 20 to reproduce a fisheye image (stored image) (operation of a feature part of Embodiment 2).

FIG. 10 is a flowchart showing the operation of the main device 20 (operation of a feature part of Embodiment 2) when a fisheye image (stored image) is reproduced.

Firstly in response to an instruction of reproduction of a fisheye image (stored image) by user's operation, the control unit 21 reads a plurality of fisheye images (stored images) recorded and stored in the recording medium of the storage unit 23 (Step C1), and converts them into thumb-nail images for displaying as a list (Step C2). FIG. 11A shows the screen on which a list of thumb-nail fisheye images is shown, and in this drawing, the circles arranged in the matrix form of 3×3 show the thumb-nail fisheye images. FIG. 11B shows a partly enlarged view of this thumb-nail list screen.

In such a state of displaying the thumb-nail list screen, the control unit 21 checks whether a predetermined touch operation (e.g., a double-tap operation) is performed or not to a display position of any thumb-nail image (Step C5). If no double-tap operation to tap on a thumb-nail image continuously twice is performed (NO at Step C3), the procedure shifts to Step C9. When a double-tap operation is performed on a thumb-nail image (YES at Step C3), the control unit 21 reads face images (corrected images) of persons recorded and stored to be associated with the fisheye image subjected to the double-tap operation (Step C4), enlarges the face images and switches the screen to display them on the reproduction screen (Step C5). FIG. 11C shows the screen of displaying a list of the face images of the persons, and the face images cut out in a rectangular shape are arranged and displayed in the order similar to that of Embodiment 1 as stated above, for example.

In such a state of displaying the list of face images on the screen, the control unit 21 checks whether a predetermined touch operation (e.g., a double-tap operation) is performed or not to the display position of any face image (Step C6). If no double-tap operation is performed on the face images (NO at Step C6), the procedure shifts to Step C9. When a double-tap operation is performed (YES at Step C6), the control unit 21 reads the corrected image that is recorded and stored to be associated with the fisheye image including the face image subjected to the double-tap operation (Step C7), and switches the screen to display the corrected image (displaying it on the whole screen) (Step C8).

In this case, the fisheye image selected on the thumb-nail list screen is specified as the fisheye image including the face image designated by touching. Then, the corrected image associated with this fisheye image is read and displayed on the switched screen. At this time, a part of the corrected image is cut out around the face image so that the face image designated by touching is located at the center, and the image is enlarged on the switched screen (displaying it on the whole screen). FIG. 11D exemplifies the case where, when the face image of the girl is double-tapped as shown in FIG. 11C, a part of the corrected image associated with the fisheye image including the face image is cut out and is enlarge for displaying. This is the case where the enlarged image including the face of the girl at the center is displayed on the switched screen.

FIG. 11E describes another display example that is different from the display example of FIG. 11D. In FIG. 11D, the fisheye image selected on the thumb-nail list screen is specified as the fisheye image including the face image designated by touching. On the contrary, in FIG. 11E another fisheye image including the face image that is different from the former fisheye image is specified, and a part of the corrected image associated with the fisheye image is cut out and is enlarged and displayed. In this case as well, a part of the corrected image is cut out around the face image so that the face image designated by touching is located at the center, and the image is enlarged on the switched screen (displaying it on the whole screen).

The present embodiment is configured so as to firstly specify the fisheye image selected on the thumb-nail list screen as the fisheye image including the face image designated by touching. In this respect, the order of specifying such a fisheye image and another fisheye image including the face image designated by touching may be set beforehand by user's operation. Alternatively, such a fisheye image and another fisheye image may be switched by user's operation as the fisheye image including the face image designated by touching, or they may be switched automatically after certain time. When a plurality of the other fisheye images are stored, these plurality of fisheye images may be specified sequentially by a switching operation, and the corrected image associated with the specified fisheye image may be read and displayed on the switched screen.

In such a state of displaying the corrected images while being switched, the control unit 21 checks whether the operation for a returning instruction is performed or not (Step C9). If no operation for a returning instruction is performed (NO at Step C9), the control unit 21 checks whether the operation for another instruction is performed or not (Step C10). When the operation for another instruction is performed (e.g., an operation to instruct image editing) (YES at Step C10), the procedure shifts to the processing corresponding to the instruction. When the operation for a returning instruction is performed (YES at Step C9), the procedure returns to Step C3 as stated above.

In this way, in Embodiment 2, when any wide-angle image is selected by user's operation from a list of thumb-nail images of the wide-angle images, images of predetermined subject parts included in the wide-angle image are displayed as a list. Thereby, even when wide-angle images each having distortion in the image as a whole are thumb-nail displayed as they are, a user can easily view the subjects. That is, since a wide-angle view (fisheye image) has a large distortion in the image as a whole, it is difficult for a user to correctly understand who are shown on the thumb-nail image. It is troublesome to check the face of each person on the image by enlarging one of the thumb-nail images by user's operation, and this will be the burden on the user. According to the present embodiment, when a user selects any thumb-nail image (fisheye image), then a list of the face images of the persons included in the fisheye image are displayed as a list. Thereby, the user can view the images of realism by the fisheye images that are displayed as thumb-nails while understanding the entire region of shooting, and can recognize easily who are shown on the image by the face images of the persons.

Further, when any face image is selected by user's operation from a list of the face images as stated above, the corrected image in which the distortion of the wide-angle view included in the face image has been corrected is displayed. Thereby a user can view a wide range of the image without distortion.

In Embodiment 2 as stated above, the distortion of a fisheye image taken is corrected to create a corrected image thereof, and face images of persons cut out from the corrected image are created. Then, the corrected image and the face images of the persons are associated with the fisheye image for recording and storage, and the face images of the persons that are associated with the fisheye image are read and displayed as a list when the fisheye is reproduced. Instead, the corrected image and the face images of the persons may be created when the fisheye image is reproduced. That is, when thumb-nails of the fisheye images are displayed, processing to correct the distortion of any fisheye image selected is performed to create a corrected image thereof. Then, face images of persons cut out from the corrected image may be created. Instead of the case of creating a corrected image and then cutting out face parts of persons in the corrected image, face images of persons may be cut out from a fisheye image, and the distortion may be corrected so as to create face images thereof.

Embodiment 2 as stated above describes the case where fisheye images are displayed as thumb-nails. Instead, corrected images obtained by correcting the distortion of the fisheye images may be displayed as thumb-nails. In this case as well, in response to user's operation to select a thumb-nail image (corrected image), the screen is switched to display a list of face images of persons included in the image similarly to Embodiment 2.

In Embodiment 2 as stated above, 360° shooting may be performed by shooting performed twice, including the forward 180° shooting and the rearward 180° shooting, and a plurality of fisheye images obtained may form a group. The shooting is not limited to 360° shooting, and the embodiment can be used for the image taken in the range of 180° as well (180° shooting).

In the embodiment as stated above, the control unit 21 is configured to, when a double-tap operation is performed on any face image, detect the position including the face image in the corrected image, and move (jump) the cut-out frame to the detected position so that the face image is included in the image (image in the cut-out frame) that is enlarged and displayed on the reproduction screen. Instead, a slide operation may be performed on any face image, and the image displayed as the any face image may be changed in accordance with the amount of the sliding. That is, the position including the any face image in the corrected image is moved in accordance with the amount of sliding, and an image at the position after movement in the corrected image may be displayed instead of the any face image. In that case, when a double-tap operation is performed on the image after movement that is displayed instead of the any face image, the control unit 21 detects the position including the image after movement in the corrected image and moves the cut-out frame to the detected position, so as to let the enlarged image on the reproduction screen include the image after movement.

(Embodiment 3)

Referring now to FIGS. 12 to 14C, Embodiment 3 of the present invention is described.

Embodiment 3 is configured so that, when a plurality of fisheye images are converted into thumb-nail images and a list thereof is displayed, a list of face images of the persons associated with each fisheye image and stored is displayed around the fisheye image. That is, it is configured so that face images of the persons associated with a thumb-nail image are displayed around the thumb-nail image. Herein, the components with the same functions and the same names in both of the embodiments have the same reference numerals, and their descriptions are omitted. In the following, feature parts of Embodiment 3 are described mainly. Embodiment 3 also is configured so that a fisheye image of vertical shooting of the forward 180° as shown in FIG. 4A and a fisheye image of vertical shooting of the rearward 180° as shown in FIG. 4B, i.e., two fisheye images obtained by shooting performed twice (360° shooting), including the forward 180° shooting and the rearward 180° shooting are recorded and stored as a group of images.

Figure 12:
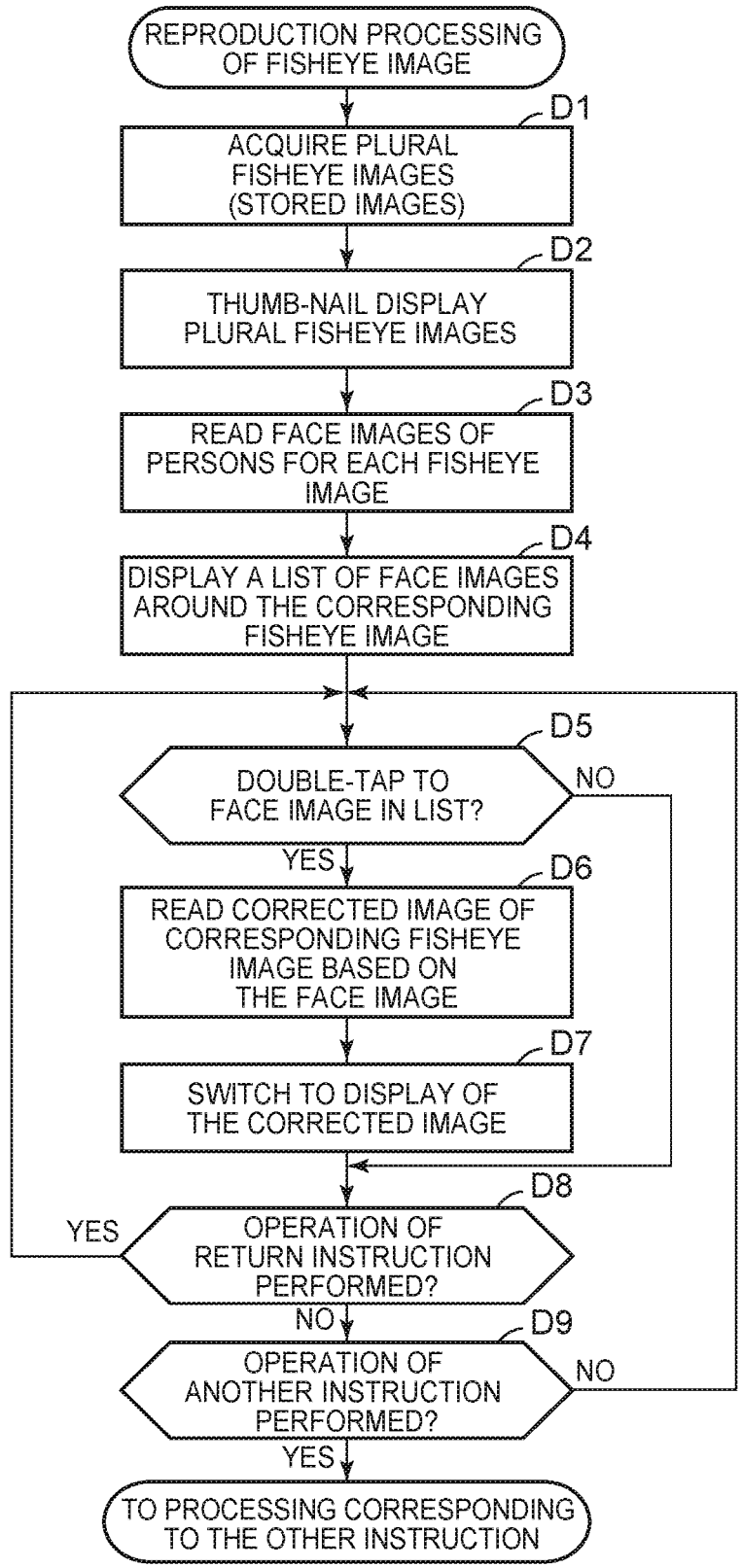
FIG. 12 is a flowchart showing the operation of the main device 20 to reproduce a fisheye image (stored image) (operation of a feature part of Embodiment 3).

FIG. 12 is a flowchart showing the operation of the main device 20 (operation of a feature part of Embodiment 2) when a fisheye image (stored image) is reproduced.

Firstly in response to an instruction of reproduction of a fisheye image by user's operation, the control unit 21 reads a plurality of fisheye images (stored images) recorded and stored (Step D1), converts them into thumb-nail images for displaying a list thereof (Step D2). Then, the control unit 21 reads face images of the persons recorded and stored to be associated with each fisheye image for each fisheye image (Step D3), and arranges and displays the face images near (around) the fisheye image (thumb-nail image) (Step D4).

Figure 13A:
FIGS. 13A to 13C explain the reproduction of a fisheye image (stored image) in Embodiment 3.
Figure 13B:
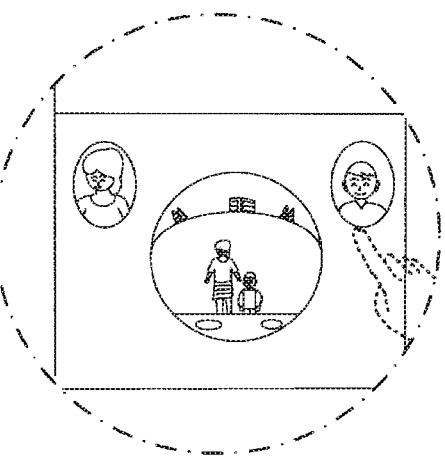

FIG. 13A shows one example of a thumb-nail list screen of the fisheye images, and in the drawing, circles arranged in the matrix form of 3×3 indicate thumb-nail images of the fisheye images, and a vertically-long small circle (ellipse) placed around each of these fisheye images (thumb-nail images) indicates a face image of a person corresponding to the fisheye image. FIG. 13B is an enlarged view of a part of this thumb-nail list screen. In the illustrated example, this is not the case of 360° shooting, but a fisheye image obtained by 180° shooting is thumb-nail displayed. A list of face images of the persons included in the fisheye image is displayed around the thumb-nail image.

Figure 14A:
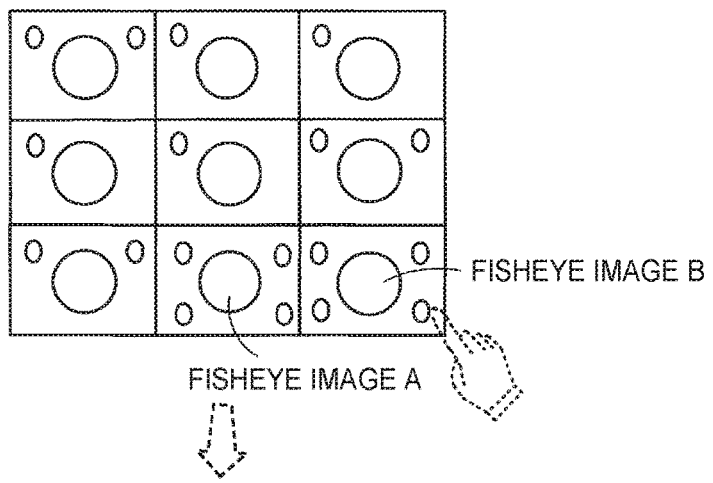
FIGS. 14A to 14C explain another state of the reproduction of a fisheye image (stored image) in Embodiment 3.

FIG. 14A shows another example of the thumb-nail list screen of fisheye images. In the drawing, fisheye image A indicates a fisheye image obtained by vertical shooting of the forward 180° as shown in FIG. 4A and fisheye image B indicates a fisheye image obtained by vertical shooting of the rearward 180° as shown in FIG. 4B. In the case of such a group of fisheye images obtained by shooting performed twice (360° shooting), including the forward 180° shooting and the rearward 180° shooting, not only the face images of the persons included in its own fisheye image but also the face images of the persons in the other fisheye image in the group are arranged around the thumb-nail image of the fisheye image.

Figure 14B:
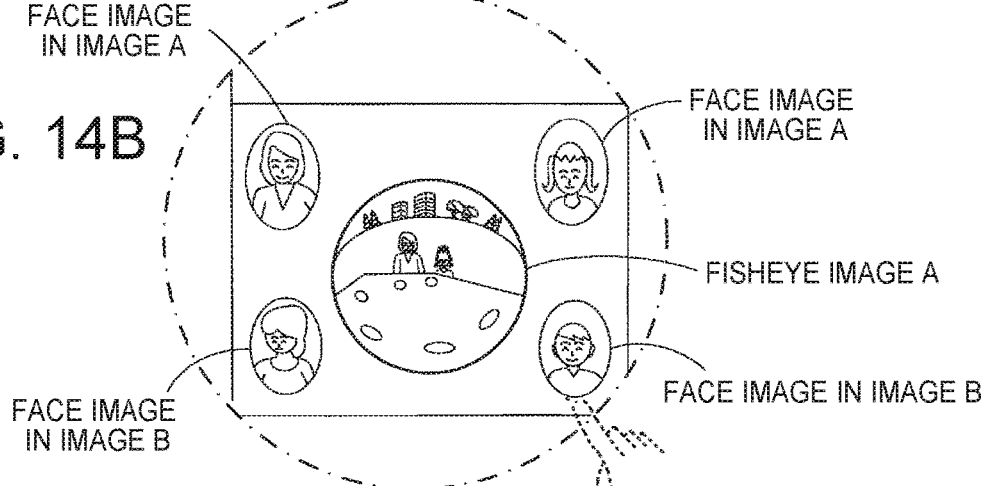
Figure 14C:
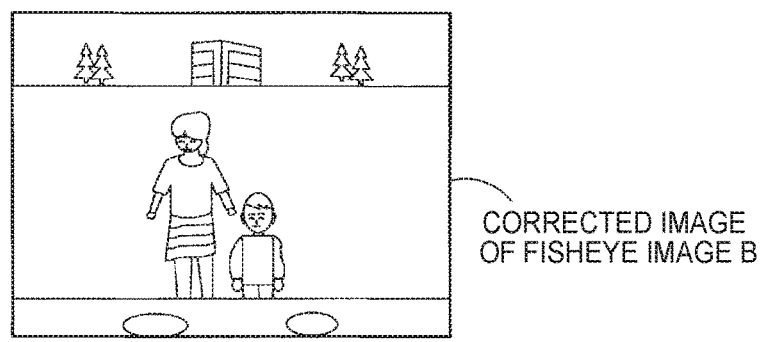

FIG. 14B is an enlarged view of a part of this thumb-nail list screen, which shows a thumb-nail display of the fisheye image A. In this case, not only the face images of a parent and a child shown in fisheye image A but also the face images of another parent and child shown in fisheye image B in the same group as this fisheye image A are displayed as a list. The same applies to the case of thumb-nail display of this fisheye image B. In this case not illustrated, not only the face images of a parent and a child shown in fisheye image B but also the face images of another parent and child shown in fisheye image A in the same group as this fisheye image B are displayed as a list around the thumb-nail image thereof.

Note here that, when face images are arranged around a thumb-nail image, these face images are adjusted to have the same size as shown in FIG. 13B and FIG. 14B and to have good balance and at regular intervals. The control unit 21 checks whether, in such a display state of the thumb-nail list screen, a position of a face image displayed in this list screen is touched (double-tapped) or not (Step D5). If no double-tap operation on a position of a face image displayed is performed (NO at Step D5), the procedure shifts to Step D8. When double-tapping is performed (YES at Step D5), the control unit 21 specifies the fisheye image corresponding to the double-tapped face image, and reads the corrected image recorded and stored to be associated with this fisheye image (Step D6), and switches the thumb-nail list screen to the corrected image for displaying (Step D7). In this case also, similarly to Embodiment 2 as stated above, the fisheye image selected on the thumb-nail list screen or another fisheye image other than the fisheye image including a face image designated by touching is specified, and the corrected image associated with such a specific fisheye image is read and displayed by switching.

Figure 13C:
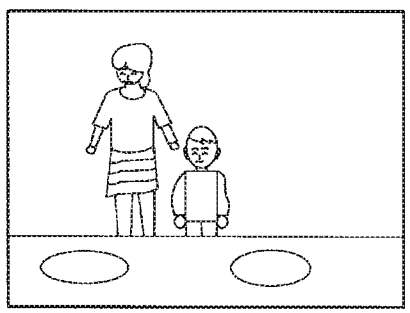

FIG. 13C shows the case where, when a face image of a child is double-tapped as shown in FIG. 13B, the corrected image including the face image is enlarged and displayed. Similarly, FIG. 14C also shows the case where the corrected image including a face image of the double-tapped child is enlarged and displayed. While FIG. 13C shows the corrected image of a thumb-nail display image, FIG. 14C displays the corrected image of image B in the same group as image A that is thumb-nail displayed.

In such a state of displaying the corrected image by switching, the control unit 21 checks whether the operation for a returning instruction is performed or not (Step D8). If no operation for returning instruction is performed (NO at Step D8), the control unit 21 checks whether the operation for another instruction is performed or not (Step D9). When the operation for another instruction is performed (e.g., an operation to instruct image editing) (YES at Step D9), the procedure shifts to the processing corresponding to the instruction. When the operation for a returning instruction is performed (YES at Step D8), the procedure returns to Step D2, in which a thumb-nail list screen is displayed.

As stated above, Embodiment 3 is configured so as to display a list of wide-angle images as thumb-nail images, and to display images of the subject parts created by cutting from the wide-angle images in association with the thumb-nail images. Therefore a user can easily recognize the subjects even with a thumb-nail display of the wide-angle images having distortion in the images as a whole.

The control unit 21 is configured to, when any one in a wide-angle image group including a plurality of wide-angle images as the group taken in different directions is thumb-nail displayed, associate images of all of the subject parts included in the wide-angle image group with the thumb-nail image for displaying. With this configuration, a user can confirm the images of all of the subject parts included in the wide-angle image group simply by checking the thumb-nail display of any one of the wide-angle image in the wide-angle image group. For instance, in the case of 360° shooting performed twice including the 180° forward shooting and the rearward° shooting, a thumb-nail image (fisheye image) of the forward 180° shooting has face images of the persons included in the fisheye image of the forward 180° shooting as well as face images of the persons included in the fisheye image of the rearward 180° shooting. Therefore a user can confirm the face images of the persons included in the fisheye image of the rearward 180° shooting without checking the thumb-nail display thereof.

In Embodiment 3 as stated above, distortion of a fisheye image taken is corrected to create a corrected image thereof, and face images of persons are created by cutting out them from the corrected image. Then, the corrected image and the face images of the persons are associated with the fisheye image for recording and storage. When each fisheye image is thumb-nail displayed, the face images of the persons associated with the fisheye image are read and displayed as a list. Then when a user designates any face image from the list, the corrected image including the face image is read for displaying. Instead, the corrected image and the face images of the persons may be created when the fisheye image is thumb-nail displayed. That is, when a fisheye image is thumb-nail displayed, the distortion of the fisheye image is corrected to create a corrected image thereof, and face images of persons are created by cutting out them from the corrected image. Instead of creating a corrected image and then cutting out face parts of the persons from the corrected image, face images of the persons may be cut out from the fisheye image and the distortion thereof may be corrected so as to create the face images.

In Embodiment 3 as stated above, 360° shooting is performed using one fisheye lens 16B by shooting performed twice, including the forward 180° shooting and the rearward 180° shooting. Instead, two of the fisheye lens 16B may be provided, e.g., each being disposed on either of the surface and the rear-face of the camera body, whereby the forward 180° shooting and the rearward 180° shooting may be performed at the same time in response to the instruction of the 360° shooting. Alternatively, 360° shooting may be performed by shooting performed a plurality of times using an ultrawide lens.

In the embodiment as stated above, the control unit 21 is configured to, when a double-tap operation is performed on any face image, detect the position including the face image in the corrected image, and move (jump) the cut-out frame to the detected position so that the face image is included in the image (image in the cut-out frame) that is enlarged and displayed on the reproduction screen. Instead, a slide operation may be performed on any face image, and the image displayed as the any face image may be changed in accordance with the amount of the sliding. That is, the position including the any face image in the corrected image is moved in accordance with the amount of sliding, and an image at the position after movement in the corrected image may be displayed instead of the any face image. In that case, when a double-tap operation is performed on the image after movement that is displayed instead of the any face image, the control unit 21 detects the position including the image after movement in the corrected image and moves the cut-out frame to the detected position, so as to let the enlarged image on the reproduction screen include the image after movement.

The embodiments as stated above describe the case of using a digital camera as the image processing device, which is not a limiting example. For instance, the image processing device may be a personal computer, a PDA (personal portable information communication device), a tablet type terminal device, a mobile phone such as a smartphone, a computerized game, a music player or the like.

In the embodiments as stated above, each of the "devices" and "units" may be separated into a plurality of bodies in accordance with their functions, and may not be configured as a single body. The steps described in the flowcharts as stated above are not limited to the time-series processing, which may be configured to process a plurality of steps in parallel or process the steps separately.

The embodiments as stated above are configured so that fisheye images or wide-angle images are displayed as thumb-nail images. Instead, images associated with these fisheye images and wide-angle images, such as images subjected to the correction of distortion in a predetermined range of the fisheye images and the wide-angle images, may be displayed as thumb-nail images.

That is a description on the embodiments of the present invention. The present invention is not limited to these embodiments, and includes the invention recited in the claims and their range of equivalency.

What is claimed is:

1. An image processing device, comprising:
an acquisition unit to acquire a wide-angle image; and
a computing device which is configured to:
recognize a predetermined person included in the wide-angle image;
correct distortion of an image portion including at least part of the person recognized in the wide-angle image; and
perform processing to associate at least a part of the wide-angle image with the image portion including the at least part of the person having the distortion corrected,
wherein the performing of the processing to associate includes having a display unit that is operable to (i) switch between displaying the at least part of the wide-angle image and displaying the image portion of the at least part of the person having the distortion corrected, or (ii) display multiple images at the same time with one of the images being the at least part of the wide-angle image and the other image being the image portion including the at least part of the person having the distortion corrected.

2. The image processing device according to claim 1, wherein
the computing device is configured to:
further correct distortion of the wide-angle image, and associate at least a part of the wide-angle image subjected to the correction of distortion with the image portion including the at least part of the person having the distortion corrected.

3. The image processing device according to claim 1, wherein the computing device is configured to associate at least a part of the wide-image angle image having distortion with the image portion including at least part of the person having the distortion corrected.

4. An image processing device, comprising:
an acquisition unit to acquire a wide-angle image; and
a computing device which is configured to:
recognize a predetermined subject included in the wide-angle image;
correct distortion of an image portion including at least part of the subject; and
perform processing to associate at least a part of the wide-angle image with the image portion including the at least part of the subject with the distortion corrected, further comprising a display unit, wherein
the computing device is configured so that:
the display unit is operable to display at least a part of the wide-angle image; and
the display unit is operable to display the image portion including the at least part of the subject with the distortion corrected so as to perform the processing of association.

5. The image processing device according to claim 4, wherein
the computing device is configured so that the display unit is operable to display at least the part of the wide-angle image and the image portion including at least the part of the subject with the distortion corrected at the same time so as to perform the processing of association.

6. The image processing device according to claim 4, wherein the acquisition unit is configured to acquire an image in a predetermined range as a part of the wide-angle image, wherein
the computing device is configured so that the display unit is operable to display the image in the predetermined range acquired by the acquisition unit, and to display the image portion including the at least part of the subject with the distortion corrected so as to perform the processing of association.

7. The image processing device according to claim 4, wherein the computing device is configured to:
recognize a predetermined subject included in a wide-angle image taken at a wide angle and detect an image of a part of the subject, and
have the display unit be operable to display at least the part of the wide-angle image and display the image of the part of the subject detected as a list so as to perform the processing of association.

8. The image processing device according to claim 7, further comprising a second selection unit that is configured to, when the image of the part of the subject is displayed as a list by the display unit, select any image of the part of the subject from the list in accordance with user's operation, wherein
the computing device is configured to, when the second selection unit selects the any image of the part of the subject, have the display unit be operable to display an image of at least a part of the wide-angle image corresponding to the part of the subject selected by the second selection unit so as to perform the processing of association.

9. The image processing device according to claim 8, wherein the computing device is configured to:
further correct distortion of a predetermined range of the wide-angle image including the image of the part of the subject selected by the second selection unit, and
when the second selection unit selects the any image of the part of the subject, have the display unit be operable to display a corrected image of the predetermined range of the wide-angle image subjected to the distortion correction so as to perform the processing of association.

10. The image processing device according to claim 7, wherein the computing device is configured to have the display unit be operable to switch from a state of displaying an image of the part of the subject as a list to a state of displaying at least a part of the wide-angle image so as to perform the processing of association.

11. The image processing device according to claim 8, wherein the computing device is configured have the display unit be operable to switch from a state of displaying an image of the part of the subject as a list on the display unit to a state of displaying at least a part of the wide-angle image corresponding to the part of the subject selected by the second selection unit on the display unit so as to perform the processing of association.

12. The image processing device according to claim 7, wherein the computing device is configured to:
recognize a plurality of predetermined subjects included in a wide-angle image taken at a wide angle and detect an image of a part of each of the subjects, and
when displaying the image of the part of each of the subjects detected as a list on the display unit, have the display unit be operable to display the images as the list in the order of the subjects being arranged on the wide-angle image.

13. The image processing device according to claim 6, further comprising a movement instruction unit to move the predetermined range freely in accordance with user's operation, wherein
the acquisition unit is configured to acquire an image in the predetermined range moved by the movement instruction unit.

14. The image processing device according to claim 4, further comprising a first selection unit that is configured to, when the display unit displays a list of thumb-nail images of the wide-angle images or images corresponding to the wide-angle images, select any wide-angle image or corresponding image from the thumb-nail images in accordance with user's operation, wherein
the computing device is configured to:
recognize a predetermined subject included in the wide-angle image or the corresponding image selected by the first selection unit and detect an image of a part of the subject,
when the first selection unit selects any wide-angle image or corresponding image, display a list of images of parts of subjects detected, the images being with the distortion corrected, on the display unit.

15. The image processing device according to claim 4, further comprising a first selection unit that is configured to, when a list of thumb-nail images of the wide-angle images or images corresponding to the wide-angle images are displayed, select any wide-angle image or corresponding image from the thumb-nail images in accordance with user's operation, wherein the computing device is configured to, when the first selection unit selects any wide-angle image or corresponding image, display the wide-angle image or the corresponding image as well as the image of the part of the subject with the distortion corrected at the same time on the display unit so as to perform the processing of association.

16. The image processing device according to claim 4, wherein the computing device is configured to:

recognize all of predetermined subjects included in a wide-angle image group including a plurality of wide-angle images as the group taken in different shooting directions and detect an image of a part of each of the subjects, and when any wide-angle image of the wide-angle image group is thumb-nail displayed, associate the images of the parts of all of the subjects included in the wide-angle image group detected, the images being subjected to the correction of distortion, with the thumb-nail displayed wide-angle image for displaying.

17. The image processing device according to claim 1, wherein the computing device is configured to recognize all predetermined persons included in a wide-angle image group including a plurality of wide-angle images as the group taken in different shooting directions and detect an image of a part of each of the persons.

18. The image processing device according to claim 17, further comprising a designation unit configured to designate one wide-angle image from a wide-angle image group including a plurality of wide-angle images as the group taken in different shooting directions, wherein the computing device is configured to associate the wide-angle image designated by the designation unit with the images of the parts of all of the persons included in the wide-angle image group detected.

19. The image processing device according to claim 1, wherein the computing device is configured to detect an image of a part of the predetermined person, and associate the wide-angle image with the image of the part of the person detected for recording and storage.

20. The image processing device according to claim 1, wherein the wide-angle image is a fisheye image taken with a fisheye lens.

21. A method for image processing by an image processing device, comprising the steps of:

recognizing a predetermined person included in a wide-angle image taken at a wide angle and detecting an image portion of at least a part of the person;

correcting distortion of the detected image portion of the at least part of the person; and associating at least a part of the wide-angle image with the corrected image portion of the at least part of the person, wherein the associating step includes having a display unit be operable to (i) switch between displaying the at least part of the wide-angle image and displaying the image portion of the at least part of the person having the distortion corrected, or (ii) display multiple images at the same time with one of the images being the at least part of the wide-angle image and the other image being the image portion including the at least part of the person having the distortion corrected.

22. A medium having a program therein to make a computer of an image processing device implement the following functions of:

recognizing a predetermined person included in a wide-angle image taken at a wide angle and detecting an image portion of at least a part of the person;

correcting distortion of the detected image portion of the at least part of the person; and associating at least a part of the wide-angle image with the corrected image portion of the at least part of the person, wherein the associating function includes having a display unit that is operable to (i) switch between displaying the at least part of the wide-angle image and displaying the image portion of the at least part of the person having the distortion corrected, or (ii) display multiple images at the same time with one of the images being the at least part of the wide-angle image and the other image being the image portion including the at least part of the person having the distortion corrected.

23. The image processing device according to claim 1; wherein the computing device is configured so that the display unit is operable to display the wide-angle image including the person.

24. The image processing device according to claim 1; wherein the computing device is configured so that the display unit is operable to display the wide-angle image without distortion corrected and the image portion having corrected distortion.

* * * * *